Figure 1:
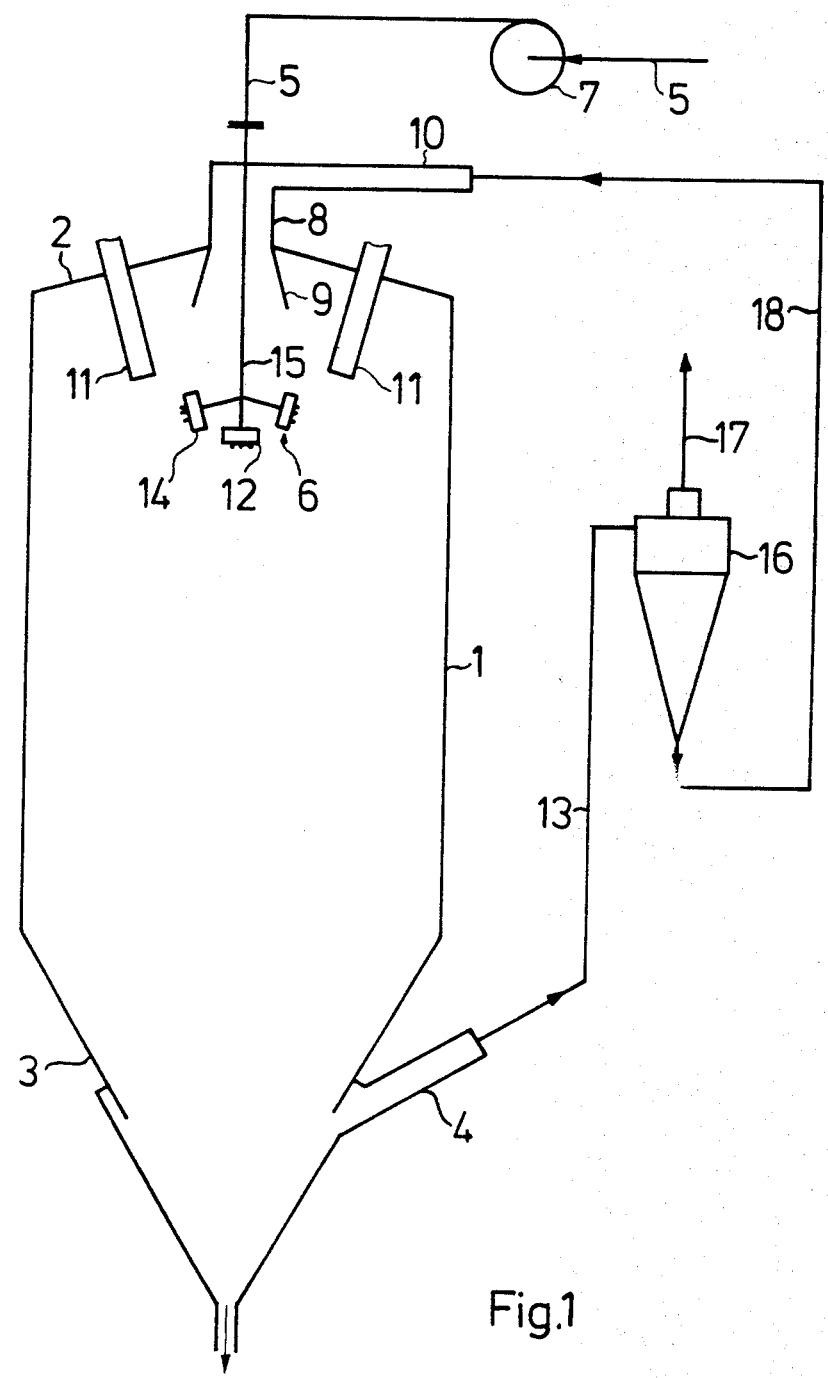

United States Patent [19]

Damman et al.

[11] Patent Number: 4,534,946
[45] Date of Patent: Aug. 13, 1985

[54] PROCESS FOR MAKING ALKALI METAL POLYPHOSPHATES

[75] Inventors: Ben Damman, Middelburg; Hans Scheffer, Vlissingen; Paul de Witte, Westkapelle, all of Netherlands; Johannes Kraüse, Hürth, Fed. Rep. of Germany; Hans Haas, Swisttal-Strassfeld, Fed. Rep. of Germany; Werner Kowalski, Weilerswist-Metternich, Fed. Rep. of Germany

[73] Assignee: Hoechst Aktiengesellschaft, Fed. Rep. of Germany

[21] Appl. No.: 558,777

[22] Filed: Dec. 6, 1983

[30] Foreign Application Priority Data

Dec. 17, 1982 [DE] Fed. Rep. of Germany ....... 3246727
Mar. 22, 1983 [DE] Fed. Rep. of Germany ....... 3310272

[51] Int. Cl.³ ............................................. C01B 25/30
[52] U.S. Cl. ..................................... 423/315; 423/305
[58] Field of Search ................................ 423/305, 315

[56] References Cited

U.S. PATENT DOCUMENTS 3,557,864  1/1971  Berg .................................... 423/315

Primary Examiner—Howard S. Williams
Attorney, Agent, or Firm—Connolly and Hutz

[57] ABSTRACT

The disclosure relates to a process for making alkali metal polyphosphates, especially alkali metal triphosphates. To this end, the disclosure provides for an alkali metal phosphate solution or suspension to be forced through at least one nozzle and for them to be sprayed inside a spray tower through a flame zone produced by a one or more burners arranged in annular fashion. More particularly, the disclosure provides for fine particulate alkali metal polyphosphates, especially alkali metal triphosphates, to be additionally introduced into the spray tower from above and for them to be regularly distributed across the spray region(s) of the nozzle(s) with formation of agglomerated products.

The disclosure also relates to an apparatus for carrying out the process. The apparatus is comprised of a cylindrical spray tower (1) having a tapered lower end (3) and being closed by means of a cover (2); a spray means (6) being passed centrally through the cover (2); a plurality of burners (11) and a solid matter feed means being passed through the cover concentrically with respect to the spray means (6) and so as to be spaced therefrom; and a bevelled issuing gas outlet (4) opening upwardly from the tapered end of the spray tower (1).

9 Claims, 5 Drawing Figures

PROCESS FOR MAKING ALKALI METAL POLYPHOSPHATES

The present invention relates to a process for making alkali metal polyphosphates, especially alkali metal triphosphates from alkali metal phosphate solutions or suspensions by forcing the feed materials through at least one nozzle and spraying them inside a spray tower through a flame zone produced by a plurality of burners arranged in annular fashion, and to an apparatus for carrying out the process.

It is known that alkali metal phosphates, especially alkali metal polyphosphates, can be made by spraying an alkali metal phosphate solution or suspension with the aid of a multi-opening nozzle through a flame zone inside a spray tower. More particularly, the spray solution travels downwardly equidirectionally with the hot gases coming from the flame zone and becomes very rapidly dehydrated and under circumstances converted to condensed phosphate. The bulk of the phosphate so made is collected in the base portion of the spray tower and continuously taken therefrom, while phosphate fines leave the spray tower together with issuing gas from which they are removed by means of one or more cyclones and wet-scrubbing treatment (cf. "Ullmann Enzyklopädie der technischen Chemie", 4th edition, volume 18, 1979, pages 326-328).

A known process (cf. European Patent Application No. 71 040) for making alkali metal phosphates, especially alkali metal polyphosphates, provides for an alkali metal phosphate solution or suspension to be forced through a plurality of single-opening nozzles under a pressure of 6 to 66 bars and to be sprayed through a flame zone produced by a plurality of burners arranged in annular fashion, inside a tower.

These prior processes are not fully satisfactory however as they do not permit the production of coarsely granular alkali metal polyphosphates with a high degree of condensation. The reason for this obviously resides in the fact that relatively large solution droplets are so reluctantly dried that the temperature prevailing in the lower portion of the spray tower is insufficient for effecting complete condensation. The present invention now provides a process for making alkali metal polyphosphates, especially alkali metal triphosphates, from alkali metal phosphate solutions or suspensions by forcing the feed materials through at least one nozzle and spraying them inside a spray tower through a flame zone produced by a plurality of burners arranged in annular fashion, and an apparatus for carrying out this process, permitting coarsely granular alkali metal polyphosphates with a high degree of condensation to be made. To this end the invention provides: for fine particulate alkali metal polyphosphates, especially alkali metal triphosphates, to be additionally introduced into the spray tower from above and to be regularly distributed across the spray region(s) of the nozzle(s), thereby effecting the formation of agglomerated products. Further preferred features of the process of this invention provide:

(a) for dusty material separated from the gas issuing from the spray tower to be used as fine particulate alkali metal polyphosphate;

(b) for fines obtained by screening product coming from the base portion of the spray tower to be used as fine particulate alkali metal polyphosphates;

(c) for dusty material separated from the gas issuing from the spray tower and fines obtained by screening product coming from the base portion of the spray tower to be used as fine particulate alkali metal phosphate;

(d) for the the fine particulate alkali metal polyphosphates to consist of particles with a size of 20 to 500 $\mu$m, preferably 20 to 250 $\mu$m;

(e) for the ratio by weight of solid matter introduced into the spray tower together with the alkali metal phosphate solutions or suspensions and fine particulate alkali metal polyphosphate introduced into the spray tower to be 0.2:1 up to 5:1, preferably 0.5:1 up to 2:1.

The apparatus for carrying out the process of this invention comprises: a cylindrical spray tower having a tapered lower end and being closed by means of a cover; a spray means being passed centrally through the cover a plurality of burners and a solid matter feed means being passed through the cover concentrically with respect to the spray means and so as to be spaced therefrom; and a bevelled issuing gas outlet opening upwardly from the tapered end of the spray tower. Further preferred features of the apparatus provide:

(f) for the solid matter feed means to be a shaft conically shaped inside the spray tower and provided with a solid matter feed pipe outside the spray tower;

(g) for the solid matter feed shaft to have an end portion conically widened inside the spray tower;

(h) for the solid matter feed shaft to have an end portion conically tapered inside the spray tower;

(i) for the solid matter feed means to comprise a plurality of feed pipes terminating in dust distributor nozzles, the feed pipes being flow-connected to the solid matter feed pipe outside the spray tower;

(j) for the dust distributor nozzles to be bevelled;

(k) for the dust distributor nozzles to be bevelled at an angle of 10° to 90°, preferably 30° to 60°, with respect to the vertical axis;

(l) for the dust distributor nozzles and spray means to be arranged level with each other;

(m) for the horizontal separation of the dust distributor nozzles from the spray means to be 60 to 90% the horizontal separation of the spray means from the burners; .

(n) for the upper end portion of the issuing gas outlet of the spray tower to open into a conduit flow-connecting it to a cyclone, solid matter separated in the cyclone being deliverable by a first conveying means into the solid matter feed pipe;

(o) for the lower end of the spray tower to have a flow-connection running to a cooler disposed below it, the condensor being flow-connected to a screening device provided with an upper socket and lower socket, screenings coming from the lower socket being deliverable by a second conveying means into the solid matter feed pipe (10);

(p) for the upper end portion of the issuing gas outlet of the spray tower to open into a conduit flow-connecting it to a cyclone and for the lower end of the spray tower to have a flow-connection running to a cooler disposed below it, the cooler being flow-connected to a screening device provided with an upper socket and lower socket, screenings coming from the lower socket being deliverable by the second conveying means, and solid matter separated in the cyclone being deliverable by the first conveying means into the solid matter feed pipe;

(q) for the upper end portion of the issuing gas outlet of the spray tower to open into a conduit flow-connecting it to a cyclone and for the lower end of the spray tower to have a flow connection running to a cooler disposed below it, the cooler being flow-connected to a screening device provided with an upper socket and lower socket, solid matter separated in the cyclone being deliverable through a line into the cooler and screenings coming from the lower socket being deliverable by the second conveying means into the solid matter feed pipe.

The alkali metal polyphosphates obtained by the process of this invention compare very favorably with prior products as regards abrasion resistance. The mean particle size determined for the alkali metal polyphosphate after a standard mechanical abrasion test is an index of abrasion resistance. Mean particle sizes of more than 0.5 mm were determined for the alkali metal polyphosphate of this invention, after the abrasion test.

The alkali metal polyphosphates of this invention have a mean particle size larger than that of prior products. In the event of the sieve fraction consisting of particles with a size of less than 0.5 mm being screened off and introduced into the spray tower from above, it is possible to obtain alkali metal polyphosphate with a mean particle size of 1 mm.

The present alkali metal polyphosphate presents a relatively narrow particle spectrum, i.e. its particle size is relatively more uniform than that of prior products.

In addition to this, the present alkali metal polyphosphate has an apparent density significantly lower than that of known products. A low apparent density is highly desirable for light alkali metal polyphosphates where apparent density is a quality defining parameter. Even upon the addition of an inflating agent, e.g. urea, to a monophosphate solution do known alkali metal polyphosphates at most enable an apparent density of 400 g/l to be obtained which is in clear contrast with the apparent density of 350 g/l and less of the alkali metal polyphosphates of this invention.

The process of this invention permits coarsely granular alkali metal polyphosphate to be made without the use of a binder whatsoever, i.e., in the absence of foreign material, just by agglomeration.

By the process of this invention it is made possible to reduce the quantity of dusty material separated in the cyclone by about 50%, based on the quantity separated heretofore. The equilibrium between dusty material absorbed by the liquid spray cone and dusty material separated in the cyclone has been found to establish after operation of the spray tower over a period of about 2 hours.

Figure 2:
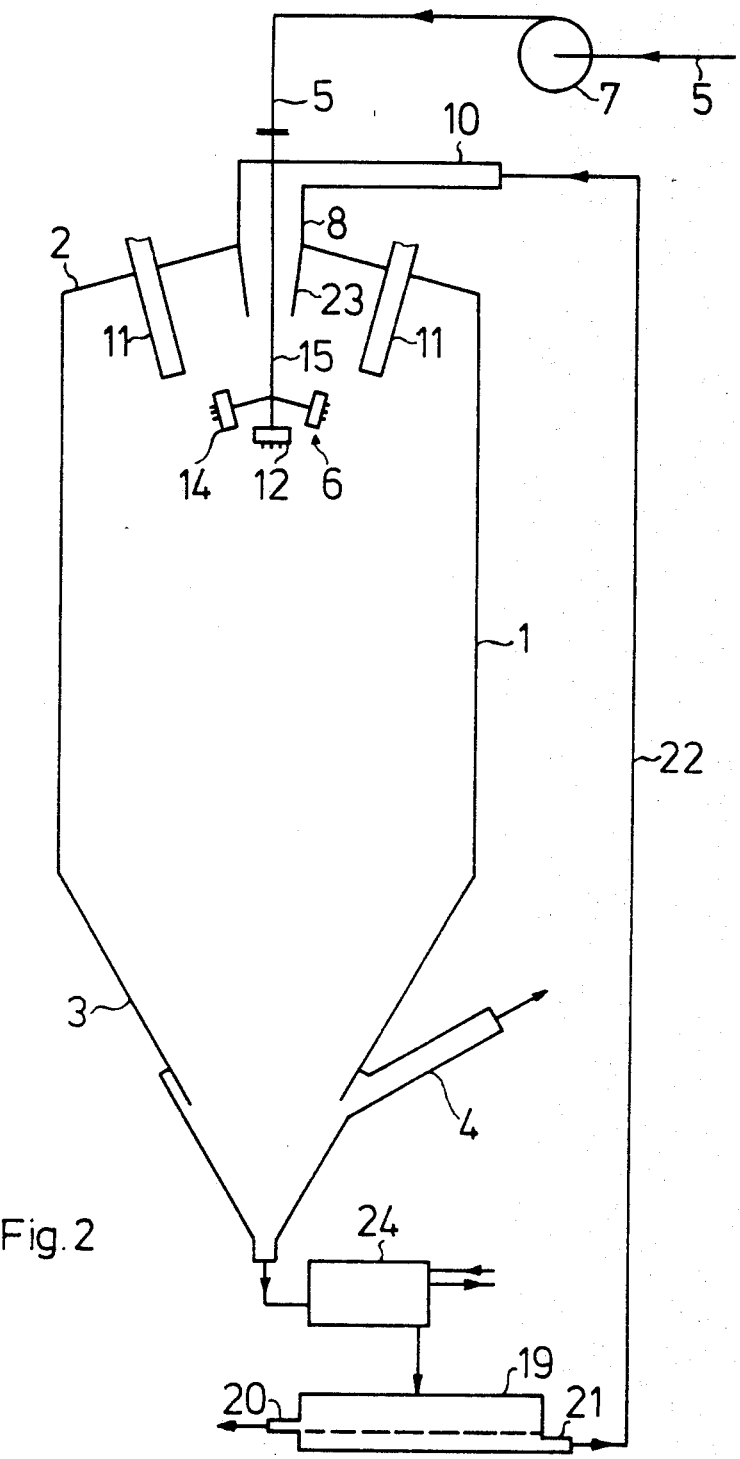
Figure 3:
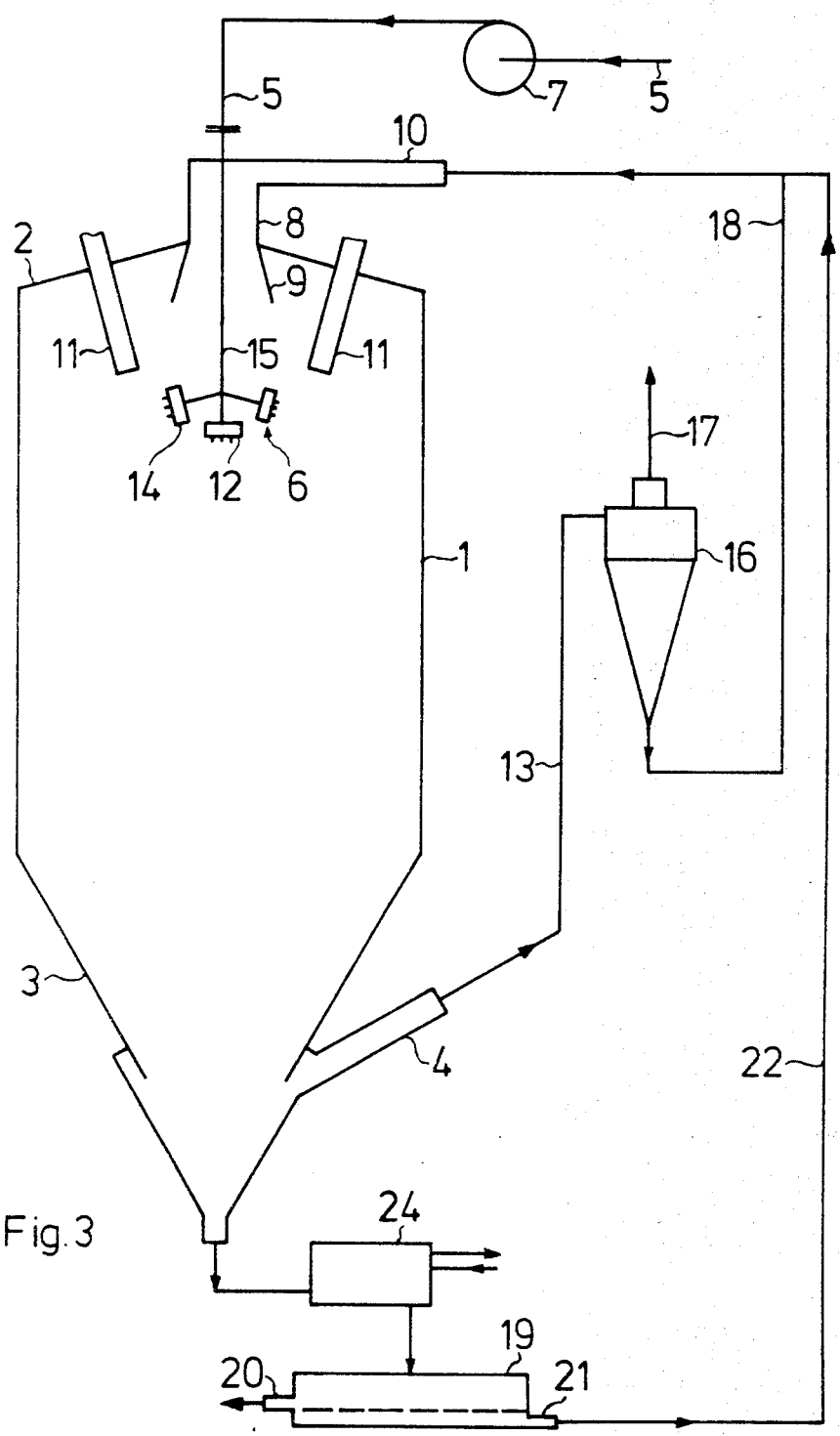
Figure 4:
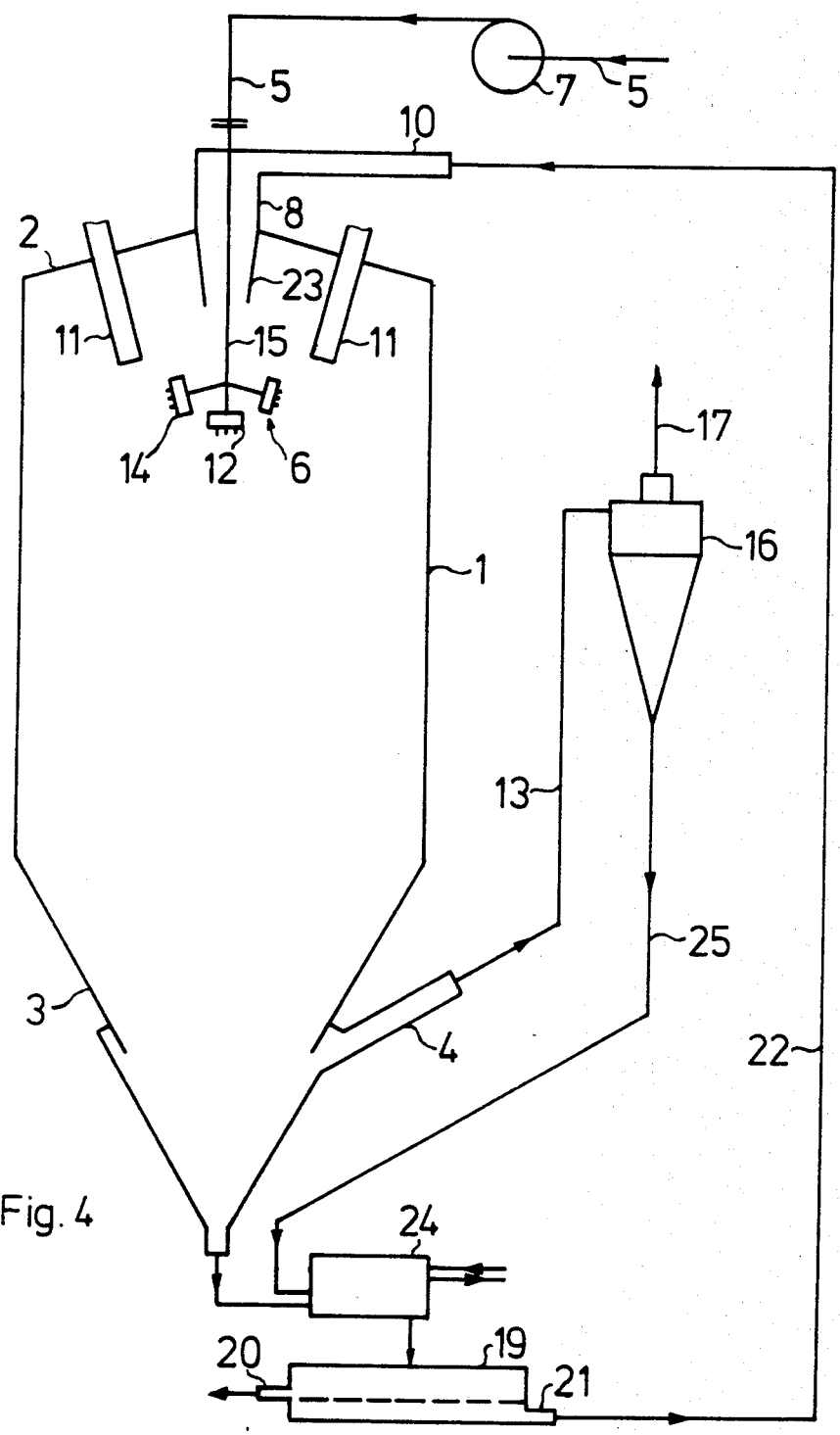
Figure 5:
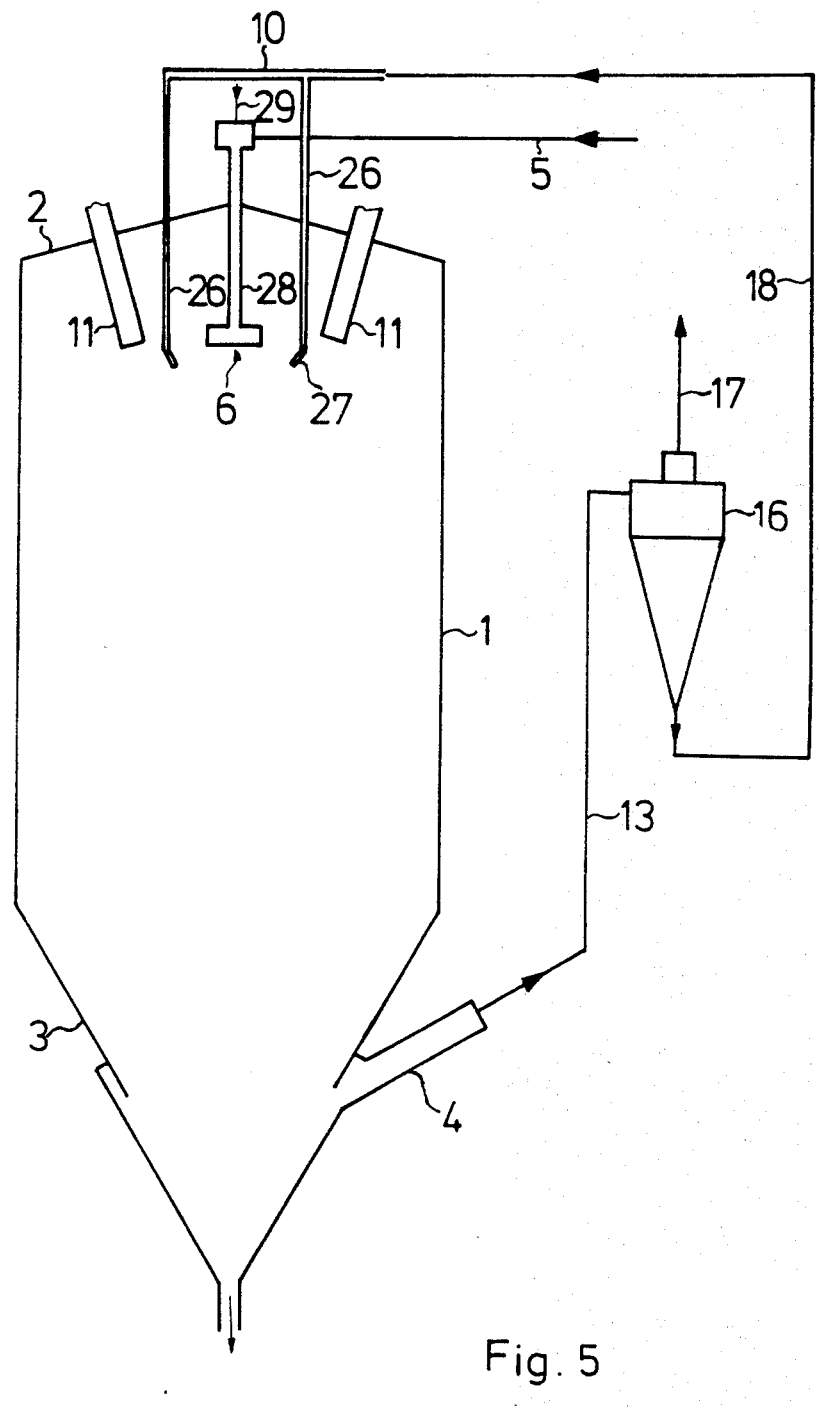

Various forms of apparatus for carrying out the process of this invention are shown diagrammatically in the accompanying drawings, of which:

FIGS. 1 and 5 are side-elevational views of a spray tower having a cyclone connected thereto, FIG. 2 is a side-elevational view of a spray tower with screening device, and FIGS. 3 and 4 are side-elevational views of a spray tower with screening device and cyclone.

With reference to the drawings:

A cylindrical spray tower 1 having a conically tapered end 3 is closed by means of a conical cover 2 which has a spray means 6 centrally passed through it, the lower end 3 being provided with an issuing gas outlet 4.

The spray means 6 may be comprised of a feed pipe 15 of which one end, outside spray tower 1, is flow-connected to a solvent feed pipe 5 provided with a pressure-increasing pump 7, while the opposite end thereof terminates in a spray head 12 whose terminal surface area is directed downwardly. Additional spray heads 14 of which the terminal surface areas are bevelled so as to face the inside wall of spray tower 1 are arranged at a level higher than spray head 12. Mounted in the terminal surface area of each spray head (12, 14) is a plurality of single opening nozzles.

The spray means 6 may also be a multi-opening nozzle 28, such as that described in U.S. Pat. No. 3,770,207 which outside spray tower 1 is flow-connected to solvent feed pipe 5 and a spray-inducing agent feed pipe 29.

Mounted annularly around spray means 6, concentrically with respect thereto and so as to be spaced therefrom, is a plurality of burners 11 which are passed through conical cover 2 and open into spray tower 1.

A solid matter feed shaft 8 mounted concentrically with respect to spray means 6 may open through conical cover 2, between spray means 6 and burners 11, into spray tower 1, the end of shaft 8 inside spray tower 1 being conically shaped, i.e. conically widened 9 or conically tapered 23. Outside spray tower 1, the solid matter feed shaft 8 terminates in a solid matter feed pipe 10.

It is also possible for a plurality of feed pipes 26 arranged annularly around spray means 6, concentrically with respect thereto, to be passed through conical cover 2 between spray means 6 and burners 11. The ends of feed pipes 26 opening into spray tower 1 have bevelled dust distributor nozzles 27 secured thereto, while the opposite ends outside spray tower 1 are flow-connected to solid matter feed pipe 10 which may be arranged in annular fashion.

As shown in FIGS. 1 and 5, issuing gas outlet 4 of spray tower 1 is connected to cyclone 16 through conduit 13. Gas issues from cyclone 16 through line 17 while separated solid matter coming from the tapered end of cyclone 16 is introduced with the aid of first conveying means 18 into solid matter feed pipe 10.

As shown in FIG. 2, a cooler 24 and screening device 19 are disposed below spray tower 1, the screening device 19 subdividing the sprayed product into a fine fraction and coarse fraction. The coarse fraction is taken from screening device 19 through upper socket 20 while the fine fraction is taken through lower socket 21 and introduced with the aid of second conveying means 22 into solid matter feed pipe 10.

As shown in FIG. 3, a cooler 24 and screening device 19 are disposed below spray tower 1. The issuing gas outlet 4 of spray tower 1 is connected to cyclone 16 through conduit 13. The fine fraction coming from screening device 19 through lower socket 21 is introduced with the aid of second conveying means 22 into solid matter feed pipe 10 just as solid matter separated in cyclone 16 is introduced thereinto through the first conveying means 18.

As shown in FIG. 4, a cooler 24 and screening device 19 are disposed below spray tower 1. The issuing gas outlet 4 of spray tower 1 is connected to cyclone 16 through conduit 13, solid matter separated in cyclone 16 being introduced into cooler 24 by means of a further conduit 25. The fine fraction coming from screening device 19 through lower socket 21 is introduced with the aid of second conveying means 22 into solid matter feed pipe 10.

The products made as described in the following Examples were subjected to the following abrasion test:

After screen analysis, 50 g product was placed in a cylindrical container (11.5 cm wide and 10.0 cm high) of stainless steel, 8 steel balls (1.96 cm in diameter; weight=32.6 g) were added and the container was closed by means of a cover. Next, the container was horizontally laid on to an electrically driven roller train and allowed to rotate thereon for 5 minutes at 100 rpm. Following this, the screen analysis was determined once again.

EXAMPLE 1

(Prior art)

The spray tower was about 15 m high and 7 m wide. The spray means was a feed pipe terminating in 5 spray heads. Placed in each spray head were 7 single opening nozzles, each nozzle opening being 4 mm wide. 8 m³/h, corresponding to 12.5 t/h, sodium orthophosphate solution containing 60 weight % solid matter, $Na_2O/P_2O_5$ in a molar ratio of 5:3 and per m³ 4 kg urea as inflating agent, was sprayed under a pressure of 11 bars through the altogether 35 nozzles. 6.4 t/h sodium tripolyphosphate with 97.0% $Na_5P_3O_{10}$, an apparent density of 430 g/l and the following particle size distribution was obtained:

| | |
|---|---|
| >0.425 mm | 16.8% |
| >0.150 mm | 84.0% |
| >0.105 mm | 91.4% |
| >0.053 mm | 99.8% |

The final product was a mixture of 1.2 t/h product which was contained in the gas issuing from the spray tower and separated in cyclones ("cyclone product") and 5.2 t/h product which was taken from the base portion of the spray tower ("tower product").

The cyclone product has the following particle size distribution:

| | |
|---|---|
| >0.425 mm | 1.8% |
| >0.150 mm | 66.7% |
| >0.105 mm | 79.3% |
| >0.053 mm | 94.0% |

The tower product had the following particle size distribution:

| | |
|---|---|
| >0.425 mm | 24.1% |
| >0.150 mm | 96.2% |
| >0.105 mm | 98.6% |
| >0.053 mm | 100.0% |

The final product had a mean particle size of 320 μm. After the abrasion test, the mean particle size was 220 μm.

EXAMPLE 2

(Invention)

8 m³/h, corresponding to 12.5 t/h, sodium orthophosphate solution containing 60 weight % solid matter, $Na_2O/P_2O_5$ in a ratio of 5:3 and per m³ 4 kg urea as an inflating agent, was sprayed under a pressure of 11 bars inside the spray tower of Example 1. At the same time, 1.3 t/h cyclone product was introduced into the spray tower through a solid matter feed shaft (cf. FIG. 1) arranged concentrically with respect to the spray means. 6.4 t/h agglomerated product which had the following properties was obtained:

| | | |
|---|---|---|
| $Na_5P_3O_{10}$-content: | 97.0% | |
| Apparent density: | 420 g/l | |
| Particle size distribution: | >0.425 mm | 35.2% |
| | >0.150 mm | 94.3% |
| | >0.105 mm | 97.7% |
| | >0.053 mm | 99.7% |

The agglomerated product had a mean particle size of 415 μm which was 270 μm after the abrasion test.

EXAMPLE 3

(Invention)

In a manner analogous to that described in Example 1, tripolyphosphate with the following properties was made:

| | | |
|---|---|---|
| $Na_5P_3O_{10}$-content: | 97.3% | |
| Apparent density: | 420 g/l | |
| Particle size distribution: | >0.425 mm | 16.5% |
| | >0.150 mm | 76.7% |
| | >0.105 mm | 88.2% |
| | >0.053 mm | 98.1% |

The product had a mean particle size of 330 μm which was 200 μm after the abrasion test.

During tripolyphosphate production, the mixture of cyclone product and tower product (cf. Example 1) was given on to a screening device and the fraction of particles with a size smaller than 250 μm was screened off and recycled into the spray tower by means of a solid matter feed shaft (cf. FIG. 4) arranged concentrically with respect to the spray means. The ratio by weight of sodium orthophosphate solution introduced into the spray tower to recycled sieve fraction was 0.8:1. The resulting agglomerated product had the following properties:

| | | |
|---|---|---|
| $Na_5P_3O_{10}$-content: | 96.8% | |
| Apparent density: | 380 g/l | |
| Particle size distribution: | >0.425 mm | 59.9% |
| | >0.150 mm | 99.8% |
| | >0.105 mm | 100.0% |

The agglomerated product had a mean particle size of 535 μm which was 290 μm after the abrasion test.

EXAMPLE 4

(Invention)

In a manner analogous to that described in Example 1, tripolyphosphate with the following properties was made:

| | | |
|---|---|---|
| $Na_5P_3O_{10}$-content: | 96.9% | |
| Apparent density: | 420 g/l | |
| Particle size distribution: | >0.425 mm | 25.2% |
| | >0.150 mm | 86.2% |
| | >0.105 mm | 92.6% |
| | >0.053 mm | 97.5% |

The product had a mean particle size of 360 μm which was 215 μm after the abrasion test.

During tripolyphosphate production, the mixture of cyclone product and tower product (cf. Example 1) was given onto a screening device and the fraction of particles with a size smaller than 500 μm was screened off and recycled into the tower through a solid matter feed shaft arranged concentrically with respect to the spray means (cf. FIG. 4). The ratio by weight of sodium orthophosphate solution introduced into the spray tower and recycled screened tripolyphosphate was 0.35:1. The resulting agglomerated product had the following properties:

| | | |
|---|---|---|
| $Na_5P_3O_{10}$-content: | 97.2% | |
| Apparent density: | 340 g/l | |
| Particle size distribution: | >0.840 mm | 25.3% |
| | >0.425 mm | 99.0% |

The agglomerated product had a mean particle size of 810 μm which was 375 μm after the abrasion test.

EXAMPLE 5
(Invention)

Example 2 was repeated but cyclone product and tripolyphosphate consisting of a sieve fraction of particles with a size smaller than 150 μm were recycled into the spray tower through a solid matter feed shaft arranged concentrically with respect to the spray means (cf. FIG. 3). The sieve fraction came from tripolyphosphate removed from the base portion of the spray tower. The ratio by weight of sodium orthophosphate solution, cyclone product and sieve fraction which were introduced jointly into the spray tower was 9:2:1.

The agglomerated product resulting from the introduction of the three components aforesaid had the following properties:

| | | |
|---|---|---|
| $Na_5P_3O_{10}$-content: | 96.5% | |
| Apparent density: | 400 g/l | |
| Particle size distribution: | >0.425 mm | 42.2% |
| | >0.150 mm | 99.2% |
| | >0.105 mm | 100.0% |

The agglomerated product had a mean particle size of 440 μm which was 260 μm after the abrasion test.

EXAMPLE 6
(Invention)

Example 5 was repeated but cyclone product and tripolyphosphate consisting of a sieve fraction of particles with a size smaller than 250 μm were recycled into the spray tower. The ratio by weight of sodium orthophosphate solution, cyclone product and sieve fraction was 1.6:1:1.

The agglomerated product had the following properties:

| | | |
|---|---|---|
| $Na_5P_3O_{10}$-content: | 97.4% | |
| Apparent density: | 370 g/l | |
| Particle size distribution: | >0.425 mm | 56.4% |
| | >0.150 mm | 99.6% |
| | >0.105 mm | 100.0% |

The agglomerated product had a mean particle size of 520 μm which was 290 μm after the abrasion test.

EXAMPLE 7
(Invention)

The spray tower was about 17 m high and 6 m wide. The spray means was a multi-opening nozzle which was fed with 4.5 t/h steam (temperature=300° C.) as the spray-inducing agent and 10.5 m³/h, corresponding to 16.8 t/h, sodium orthophosphate solution containing 30 weight % solid matter, $Na_2O/P_2O_5$ in a ratio of 5:3 and per m³ 4 kg urea as an inflating agent. At the same time, cyclone product was introduced into the spray tower through two feed pipes arranged concentrically with respect to the spray means. The two feed pipes terminated in dust distributor nozzles bevelled at an angle of 45° with respect to the vertical axis. The dust distributor nozzles and multi-opening nozzle were arranged level with each other, the horizontal separation of the dust distributor nozzles from the multi-opening nozzle being 600 mm. The horizontal separation of the burners from the multi-opening nozzle was 700 mm.

8.8 t/h sodium tripolyphosphate was obtained. The ratio of tower product to cyclone product was found to vary as follows depending on the operation period of the spray tower.

| Operation period (h) | Tower product (t/h) | Cyclone product (t/h) |
|---|---|---|
| 0 | 5.3 | 3.5 |
| 1 | 6.1 | 2.7 |
| 2 | 6.2 | 2.6 |
| 3 | 6.2 | 2.6 |

Product obtained during the third hour of operation had the following properties:

| | | |
|---|---|---|
| $Na_5P_3O_{10}$-content: | 97.2% | |
| Apparent density: | 480 g/l | |
| Particle size distribution: | >0.425 mm | 34.1% |
| | >1.150 mm | 67.0% |
| | >0.105 mm | 88.3% |
| | >0.053 mm | 97.1% |

The product had a mean particle size of 350 μm which was 190 μm after the abrasion test.

EXAMPLE 8
(Invention)

Example 7 was repeated but the horizontal separation of the dust distributor nozzles from the multi-opening nozzle was 450 mm.

The ratio of tower product to cyclone product was found to vary as follows depending on the operation period of the spray tower.

| Operation period (h) | Tower product (t/h) | Cyclone product (t/h) |
|---|---|---|
| 0 | 5.3 | 3.5 |
| 1 | 6.2 | 2.6 |
| 2 | 7.1 | 1.7 |
| 3 | 7.1 | 1.7 |
| 4 | 7.1 | 1.7 |
| ' | ' | ' |
| ' | ' | ' |
| ' | ' | ' |
| 15 | 7.1 | 1.7 |
| 16 | 7.1 | 1.7 |

Product obtained during the 16th hour of operation had the following properties:

| $Na_5P_3O_{10}$-content: | 97.3% | |
|---|---|---|
| Apparent density: | 470 g/l | |
| Particle size distribution: | >0.425 mm | 36.8% |
| | >0.150 mm | 72.0% |
| | >0.105 mm | 90.1% |
| | >0.053 mm | 98.0% |

The product had a mean particle size of 370 μm which was 200 μm after the abrasion test.

We claim:

1. In a process for making alkali metal polyphosphates from alkali metal phosphate solutions and suspensions, respectively, by forcing the feed materials through at least one nozzle and spraying said feed materials inside a spray tower through a flame zone produced by a plurality of burners arranged in annular fashion, the improvement which comprises additionally introducing dusty material separated from the gas issuing from the spray tower into the spray tower from above and regularly distributing said dusty material across the spray region of the at least one nozzle and thereby effecting the formation of agglomerated alkali metal polyphosphates.

2. The process as claimed in claim 1, wherein the dusty material consists of particles with a size of 20 to 500 μm.

3. The process as claimed in claim 1, wherein the ratio by weight of solid matter introduced into the spray tower together with the alkali metal phosphate solutions and suspensions, respectively, and the dusty material introduced into the spray tower is 0.2:1 up to 5:1.

4. In a process for making alkali metal polyphosphates from alkali metal phosphate solutions and suspensions, respectively, by forcing the feed materials through at least one nozzle and spraying said feed materials inside a spray tower through a flame zone produced by a plurality of burners arranged in annular fashion, the improvement which comprises additionally introducing fines obtained by screening alkali metal polyphosphate coming from the base portion of the spray tower into the spray tower from above and regularly distributing said fines across the spray region of the at least one nozzle and thereby effecting the formation of agglomerated alkali metal polyphosphates.

5. The process as claimed in claim 4, wherein the fines consist of particles with a size of 20 to 500 μm.

6. The process as claimed in claim 4, wherein the ratio by weight of solid matter introduced into the spray tower together with the alkali metal phosphate solutions and suspensions, respectively, and the fines introduced into the spray tower if 0.2:1 up to 5:1.

7. In a process for making alkali metal polyphosphates from alkali metal phosphate solutions and suspensions, respectively, by forcing the feed materials through at least one nozzle and spraying said feed materials inside a spray tower through a flame zone produced by a plurality of burners arranged in annular fashion, the improvement which comprises additionally introducing dusty material separated from the gas issuing from the spray tower and fines obtained by screening product coming from the base portion of the spray tower into the spray tower from above and regularly distributing said dusty material and said fines across the spray region of the at least one nozzle and thereby effecting the formation of agglomerated alkali metal polyphosphates.

8. The process as claimed in claim 7, wherein the dusty material and the fines consist of particles with a size of 20 to 500 μm.

9. The process as claimed in claim 7, wherein the ratio by weight of solid matter introduced into the spray tower together with the alkali metal phosphate solutions and suspensions, respectively, and the dusty material and the fines introduced into the spray tower is 0.2:1 up to 5:1.

* * * * *